United States Patent [19]

Kurihara et al.

[11] Patent Number: 4,981,192
[45] Date of Patent: Jan. 1, 1991

[54] POWER TRANSMISSION APPARATUS

[75] Inventors: Sakuo Kurihara; Masao Teraoka, both of Tochigi, Japan

[73] Assignee: Tochigifujisangyo Kabushiki Kaisha, Japan

[21] Appl. No.: 322,641

[22] Filed: Mar. 13, 1989

[30] Foreign Application Priority Data

Mar. 14, 1988 [JP] Japan .................................. 63-58235
Aug. 17, 1988 [JP] Japan .................................. 63-203262

[51] Int. Cl.$^5$ ............................................ B60K 23/08
[52] U.S. Cl. .................................. 180/247; 74/665 G; 74/650
[58] Field of Search ............... 180/233, 247, 248, 249, 180/250, 251; 74/65 O, 665 H, 645, 467, 473 R, 665 GE, 665 T

[56] References Cited

U.S. PATENT DOCUMENTS

| 4,650,028 | 3/1987 | Eastman et al. | 180/248 |
| 4,699,237 | 10/1987 | Matsumoto | 180/250 |
| 4,728,010 | 3/1988 | Johnston | 722/397 |
| 4,784,016 | 11/1988 | Masuda et al. | 74/650 |

FOREIGN PATENT DOCUMENTS 0149302 7/1985 European Pat. Off. .
0236650 9/1987 European Pat. Off. .

Primary Examiner—Richard A. Bertsch
Assistant Examiner—Richard Camby
Attorney, Agent, or Firm—Samuels, Gauthier & Stevens

[57] ABSTRACT

To realize three functions of twin viscous coupling in four-wheel drive, free coupling in two-wheel drive, and further direct (lock) coupling in four-wheel drive, the power transmission apparatus for transmitting power from a propeller shaft (9A) to two right and left rear wheel drive shafts (21A, 23A), comprises first and second hubs (4, 5) coupled to the drive shafts; cylindrical inner and outer casings (3a3b) for forming two working chambers (11, 12) in cooperation with the two hubs; first and second resistance plates (8, 9), and a driven member (17) for selectively engaging the inner casing with the outer casing (TWIN VISCO IN 4WD) and disengaging the inner casing from the outer casing (FREE IN 2WD). Further, it is also preferable to use hollow clutch pipes (99, 101) disposed between the two drive shafts (21A, 23A) and the two hubs (49, 51) for selectively engaging the two drive shafts with the two hubs (TWIN VISCO IN 4WD) or with the cylindrical casing (29) (LOCK IN 2WD), and disengaging the two drive shafts from both the two hubs and the cylindrical casing (FREE IN 2WD).

3 Claims, 6 Drawing Sheets (TWIN VISCO IN 4WD)

(FREE IN 2WD)

(TWIN VISCO IN 4WD)

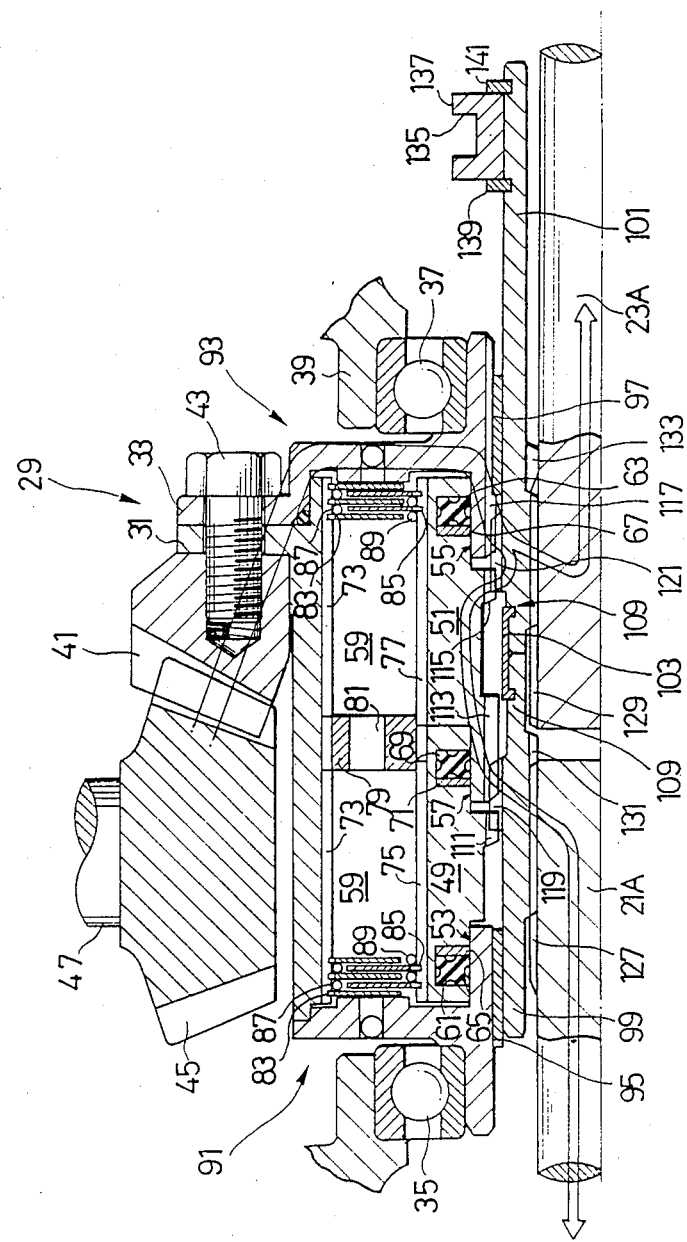

POWER TRANSMISSION APPARATUS

BACKGROUND OF THE INVENTION

1. Field of the Invention

The present invention relates to a power transmission apparatus, and more specifically to a power transmission apparatus provided with viscous coupling suitable for use in four-wheel drive vehicles by which an engine power transmission system can be switched from two-wheel drive to four-wheel drive or vice versa.

2. Description of the Prior Art

FIG. 1 is a diagram for assistance in explaining an engine power transmission system for a four-wheel drive (4WD) vehicle. In the drawing, a drive power generated by an engine 1A is speed-changed by a transmission 3A, and then transmitted from a transfer 5A directly to a front wheel side differential gear 7A and to a rear wheel side differential gear 11A via a propeller shaft 9A. The front wheel side differential gear 7A distributes a transmitted power differentially to two (right and left) front wheels 19A and 17A. The rear wheel side differential gear 11A distributes a transmitted power differentially to two (right and left) rear wheels 27A and 25A.

The power transmission apparatus provided with viscous coupling of the present invention is related to the rear wheel side differential gear 11A shown in FIG. 1.

In conventional four-wheel drive vehicles for transmitting torque from an internal combustion engine 1A to front and rear wheels, there exists a problem in that braking phenomenon occurs when the vehicle is driven along a sharp corner as when the vehicle is being put into a garage. To overcome this problem, the four-wheel drive vehicle is usually provided with a differential gear 11A for absorbing a difference in rotational speed between the front and rear wheel drive shafts.

In this four-wheel drive vehicle, when the vehicle travels on a muddy road surface (whose friction coefficient is small) and therefore a front wheel slips, only a small torque (required for a slipping front wheel whose friction coefficient is small) is transmitted from the internal combustion engine 1A to the front and rear wheels in dependence upon the differential gear construction, so that it is impossible to extricate the vehicle out of the muddy road. To overcome this problem, the four-wheel drive vehicle is usually provided with a viscous coupling including a differential limiting device by which differential operation of the differential gear is limited so that the vehicle can be extricated out of a muddy road, as disclosed in "Automobile Engineering" page 62, June, 1987.

On the other hand, a part-time four-wheel drive vehicle is usually provided with a transfer 5A by which two-wheel drive can selectively be switched to four-wheel drive or vice versa. However, when the two-wheel drive is selected through the transfer 5A, the driven side power transmission system from the transfer to the rear wheels is rotated by the running vehicle. Once the driven side power transmission system is rotated, there exist problems in that vehicle travelling resistance increases and therefore vehicle vibration and noise increase. To overcome the above-mentioned problems, there has been proposed a power interruption apparatus for an four-wheel drive vehicle, by which a part of the driven side power transmission system is disconnected, when the vehicle is driven in two-wheel drive mode, to allow the driven side thereof to be free in order that the above-mentioned travelling resistance, vibration and noise can be reduced as low as possible, as disclosed in Japanese Published Unexamined (Kokai) Pat. Application No. 60-215428.

In the former prior-art four-wheel drive vehicle provided with a viscous coupling, although difference in the number of revolutions between the front and rear wheel drive shafts can be absorbed to allow the vehicle from being driven away from the muddy road, since the four wheels are always driven by the engine, there exists a problem in that the fuel consumption rate is high during vehicle travelling.

On the other hand, in the latter prior-art four-wheel drive vehicle provided with a power interruption apparatus, since the vehicle is driven in two-wheel drive mode, it is possible to improve the fuel consumption rate and also reduce the travel resistance, vibration and noise due to the rotation of the driven side power transmission system. However, there exists a problem in that braking phenomenon occurs when the vehicle is driven along a sharp corner and therefore the vehicle cannot travel smoothly because the difference in the number of revolutions between the front and rear drive shafts cannot be absorbed during four-wheel drive travelling.

Further, Japanese Published Unexamined (Kokai) Patent Application No. 60-172764 discloses a power transmission apparatus usable for use in four-wheel drive (4WD) vehicles. This prior-art apparatus is disposed between a suboutput shaft of a transaxle and a rear wheel driving apparatus, and constructed in such a way that an output shaft of the viscous coupling is connected to the rear wheel driving apparatus and the suboutput shaft of the transaxle is connected to or disconnected from input and output shafts of the viscous coupling.

In this prior-art apparatus, three drive modes can be obtained as follows: (1) when the suboutput shaft of the transaxle is disconnected from the input shaft of the viscous coupling, a two-wheel drive (2WD) can be attained; (2) when the suboutput shaft of the transaxle is connected to the input shaft of the viscous coupling, an automatic four-wheel drive (4WD) can be attained (a torque corresponding to a difference in relative revolution speed between the input and output shafts of the viscous coupling can be transmitted); and (3) when the suboutput shaft of the transaxle is connected to the output shaft of the viscous coupling, a direct coupling four-wheel drive (4WD) can be attained.

In this prior-art apparatus as described above, however, there still exist problems in that since the viscous coupling and the rear wheel drive apparatus are rotated by the rear wheels even during the two-wheel drive (2WD) operation, the fuel consumption rate is high and further vibration and noise are produced due to the agitation resistance of the differential gear oil.

SUMMARY OF THE INVENTION

With these problems in mind, therefore, it is the primary object of the present invention to provide a power transmission apparatus provided with three functions of free coupling (power interruption) in two-wheel drive, twin viscous coupling in four-wheel drive and direct coupling (power lock) in four-wheel drive.

To achieve the above-mentioned object, the power transmission apparatus for transmitting power from a propeller shaft (9A) to two first and second rear wheel drive shafts (21A, 23A) in a four-wheel drive vehicle, according to a first aspect of the present invention, comprises (a) a first hub (4) coupled to the first rear wheel drive shaft (21A); (b) a second hub (5) coupled to the second rear wheel drive shaft (23A) and aligned with said first hub; (c) a cylindrical inner casing (3b) disposed coaxially with and rotatably relative to said first and second hubs so as to cover said first and second hubs; (d) an annular spacer (10), disposed within said cylindrical inner casing, for forming a first working chamber (11) between said first hub and said cylindrical inner casing and a second working chamber (12) between said second hub and said cylindrical inner casing; (e) a plurality of first resistance plates (8) engaged with an inner circumferential surface of said inner casing; (f) a plurality of second resistance plates (9) engaged with an outer circumferential surface of said first and second hubs, each of said second resistance plates intervening between two of said first resistance plates; (g) a cylindrical outer casing (3a) formed with a ring gear (2) and disposed coaxially with and rotatably relative to said cylindrical inner casing so as to cover said inner casing with a gap (21) between said inner and outer casings; (h) a drive pinion gear (1) coupled to the propeller shaft and in mesh with the ring gear; and (i) means for engaging said outer casing (3a) with said inner casing (3b) to realize a twin viscous coupling in four-wheel drive and disengaging said outer casing from said inner casing to realize free coupling in two-wheel drive.

When a big difference in rotational speed is generated between the first and second rear wheel drive shafts, a torque is directly transmitted from the inner casing to one of the rear wheel drive shafts rotating at a low speed via the first and second resistance plates directly brought into frictional contact with each other due to a rise in temperature within one of the two working chambers, to realize a direct coupling in four-wheel drive (called hump phenomenon).

Further, the power transmission apparatus for transmitting power from a propeller shaft (9A) to two first and second rear wheel drive shafts (21A, 23A) in a four-wheel drive vehicle according to a second aspect of the present invention, comprises (a) a first hub (49) coupled to the first rear wheel drive shaft (21A); (b) a second hub (51) coupled to the second rear wheel drive shaft (23A) and aligned with said first hub; (c) a cylindrical casing (29) formed with a ring gear (41) and disposed coaxially with and rotatably relative to said first and second hubs so as to cover said first and second hubs, a working chamber (59) being formed between said first and second hubs and said cylindrical casing; (d) a plurality of first resistance plates (85) engaged with an inner circumferential surface of said casing; (e) a plurality of second resistance plates (83) engaged with an outer circumferential surface of said first and second hubs, each of said second resistance plates intervening between two of said first resistance plates; (f) a drive pinion gear (45) coupled to the propeller shaft and in mesh with the ring gear of said cylindrical casing; and (g) clutch means (99, 101), disposed between the two first and second rear wheel drive shafts and said first and second hubs, for selectively engaging the two rear wheel drive shafts (21A, 23A) with said two hubs (49, 51) to realize a twin viscous coupling in four-wheel drive, directly engaging the two rear wheel drive shafts (21A, 23A) with said cylindrical casing (29) to realize a viscous coupling lock in four-wheel drive, and disengaging the two rear wheel drive shaft from both said two hubs and said cylindrical casing to realize free coupling in two-wheel drive.

The first aspect apparatus is disposed between the propeller shaft and the rear wheel drive shaft. During two-wheel drive travelling, the driven member is moved to disengage the outer casing from the inner casing. Under these conditions, since the drive system from this outer casing to the transfer will not be driven in the torque reverse direction, it is possible to improve the fuel consumption rate. Further, during four-wheel drive travelling, the driven member is moved to engage the outer casing with the inner casing. Under these conditions, the vehicle can be driven in four-wheel drive travelling without producing the tight corner braking phenomenon. In addition, when either one of the two front wheels is slipped, the other wheel can drive the vehicle by the direct coupling (hump), so that the vehicle can travel stably. In summary, the power transmission apparatus for the four-wheel drive vehicle according to the present invention can improve the fuel consumption rate during two-wheel drive travelling without producing the tight corner braking phenomenon.

In the second aspect apparatus, when the hub member is engaged with the rear wheel drive shaft by means of clutch means, a torque can be transmitted from the cylindrical casing to the shaft via the viscous coupling. Under these conditions, the more the difference in revolution speed between the casing and the shaft is, the more will be restricted the revolution difference and therefore the higher will be the transmittable torque. The less the difference in revolution speed is, the more will be allowed the revolution difference and therefore the lower will be the transmittable torque. Further, when the shaft is directly connected to the casing by means of clutch means, a torque can be transmitted without passing through the viscous coupling. Furthermore, when the shaft is disengaged from both the casing and hub member, torque transmission can be interrupted.

BRIEF DESCRIPTION OF THE DRAWINGS

The features and advantages of the power transmission apparatus according to the present invention will be more clearly appreciated from the following description taken in conjunction with the accompanying drawings in which;

FIG. 7 is a cross-sectional view showing the same second embodiment, in which the casing is directly connected to two rear wheel drive shafts to realize the lock mode in four-wheel drive operation to drive the vehicle on a muddy road at high speed.

DETAILED DESCRIPTION OF THE PREFERRED EMBODIMENTS

The present invention will be described in detail hereinbelow with reference to the attached drawings.

Figure 1:
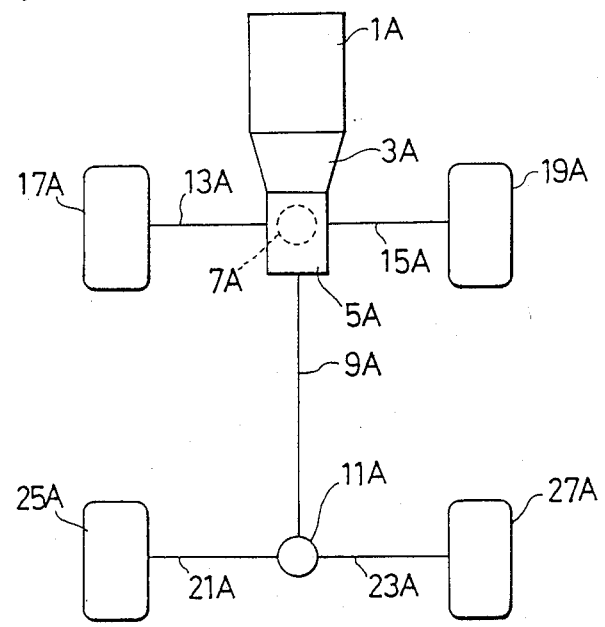
FIG. 1 is a diagram for assistance in explaining an engine power transmission system for a four-wheel drive vehicle.
Figure 2:
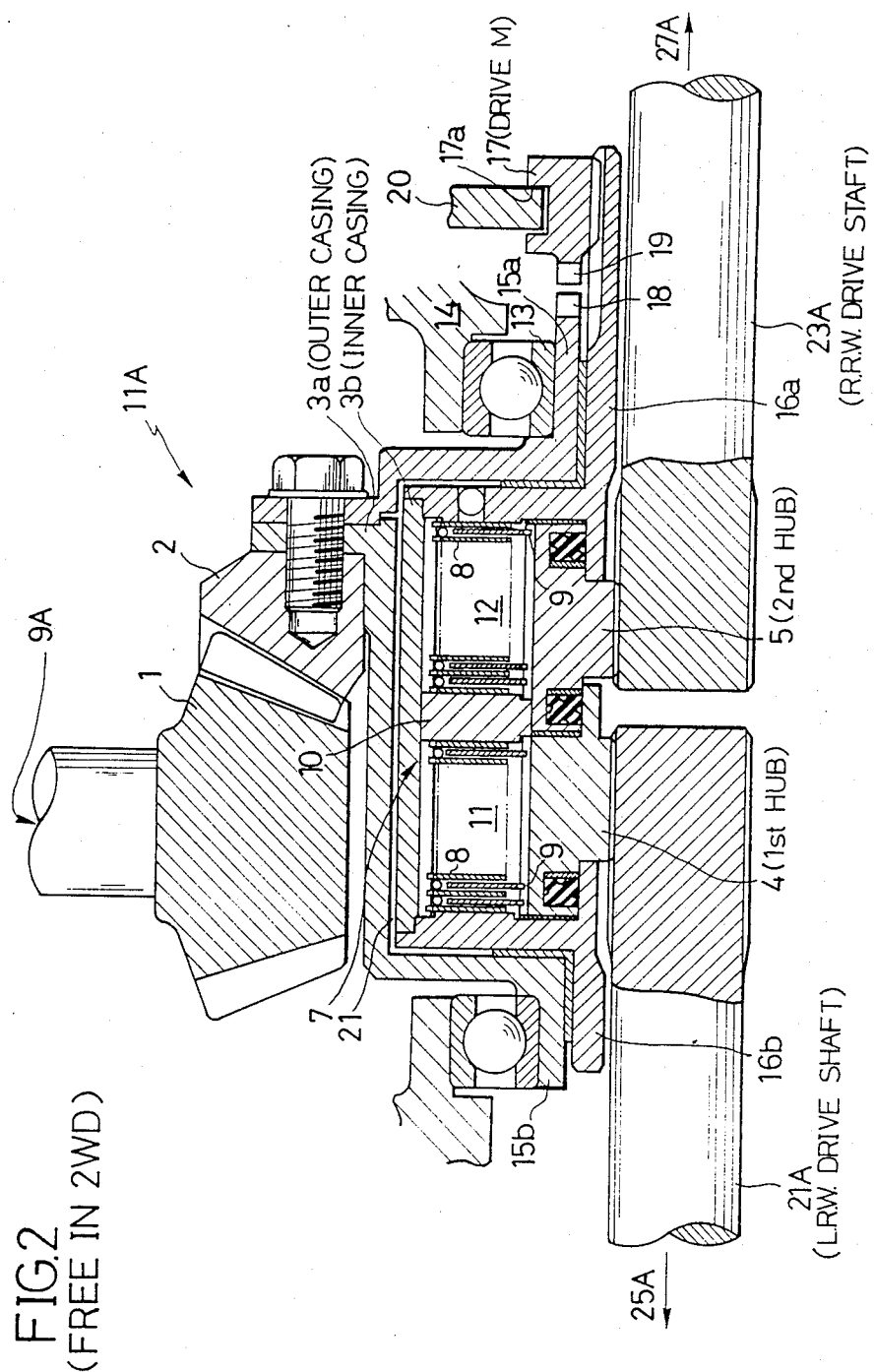
FIG. 2 is a cross-sectional view showing a first embodiment of the power transmission apparatus according to the present invention, in which the casing is disengaged from the viscous coupling to realize the free mode in two-wheel drive operation to eliminate vibration and noise.
Figure 3:
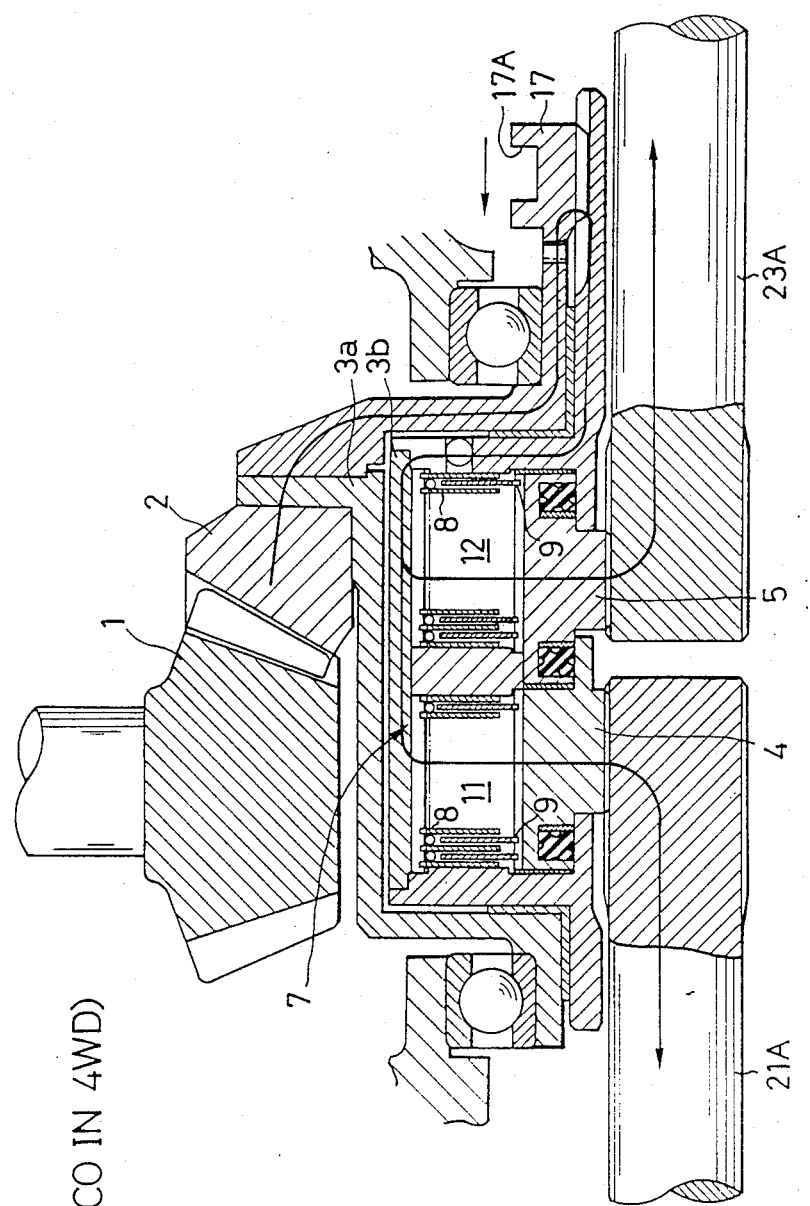
FIG. 3 is a cross-sectional view showing the same first embodiment, in which the casing is engaged with the viscous coupling to realize the twin viscous coupling mode in four-wheel drive operation to extricate the vehicle out of a muddy road.

FIGS. 2 and 3 show a first embodiment of the power transmission apparatus for a four-wheel drive vehicle. This power transmission apparatus corresponds to a rear differential gear 11A shown in FIG. 1, and disposed between a propeller shaft 9A and two rear wheel side drive shafts 21A and 23A in an FF (front engine and front drive) based four-wheel drive vehicle, in place of an ordinary differential gear.

An engine torque is transmitted from an internal combustion engine 1A to a drive pinion gear 1 via a propeller shaft 9A shown in FIG. 1.

This drive pinion gear 1 is in mesh with a ring gear 2 fixed to a cylindrical outer casing 3a. A roughly cylindrical inner casing 3b is fitted to the inner side of the outer casing 3a, so that the outer casing 3a is rotatably supported by this inner casing 3b.

A first hub 4 and a second hub 5 are housed within the inner casing 3b so as to be rotatable relative to each other. Further, the first hub 4 spline-coupled to the lefthand rear wheel drive shaft 21A and the second hub 5 also spline-coupled to the righthand rear wheel drive shaft 23A are disposed coaxially with each other.

A working chamber 7 is formed between the inner casing 3b and the first and second hubs 4 and 5 and filled with viscous fluid such as silicon oil. First resistance plates 8 and the second resistance plates 9 are arranged within the working chamber 7. The first resistance plates 8 are spline-engaged with the inner casing 3b and the second resistance plates 9 are spline-engaged with the first and second hubs 4 and 5 alternately so that each resistance plate intervenes between the two other resistance plates. At roughly the middle position of the working chamber 7, a spacer 10 fixed to the inner casing 3b is disposed so that the working chamber 7 can be partitioned into the first working chamber 11 and the second working chamber 12 by this spacer 10. Here, the well-known viscous coupling function can be attained by the inner casing 3b, the first and second hubs 4 and 5, the working chamber 7, the first and second resistance plates 8 and 9, and silicon oil within the working chamber 7. The outer casing 3a includes two first cylindrical support members 15a and 15b provided on the right and left end sides in FIG. 2. These two cylindrical portions 15a and 15b are rotatably supported by a differential gear carrier 14 via two bearings 13. Further, the inner casing 3b includes two second cylindrical support members 16a and 16b provided on the inner circumferential surface of the first cylindrical support members 15a and 15b. The righthand end of the second cylindrical support member 16a extends beyond that of the first cylindrical support member 15a in FIG. 2, and a roughly annular driven member 17 is spline engaged with the outer circumferential surface of this extended second cylindrical support member 16a so as to be slidable in the axial direction of the right wheel drive shaft 23A (in the right and left direction in FIG. 2). The inner circumferential side surface of the first cylindrical support member 15a is located so as to oppose that of the driven member 17. These two opposed circumferential side surfaces are formed with a pair of gears (engagement portions) 18 and 19 so as to be engageable with each other. A fitting groove 17a is formed on the outer circumferential surface of the drive member 17. A fork 20 is fitted to this fitting groove 17a. When this fork is slid by a fork shift mechanism (not shown), the gear 19 of the driven member 17 is engaged with the gear 18 of the first cylindrical support member 15a. Here, the drive power interruption function for a four-wheel drive vehicle can be attained by the outer casing 3a, the inner casing 3b, the driven member 17 and the gears 18 and 19. Further, a gap 21 is formed between the outer casing 3a and the inner casing 3b.

The function of the apparatus will be described hereinbelow.

Where an FF-type four wheel drive vehicle is required to be driven in front-wheel (two-wheel) drive (FREE IN 2WD) mode by actuating the transfer, the fork 20 is moved by the shift mechanism to slide the driven member 17 in the rightward direction in FIG. 2. Under these conditions, since the driven member 17 is separated from the first cylindrical support member 15a, the gear 19 of the driven member 17 is also disengaged from the gear 18 of the first cylindrical support member 15a, so that the gear engagement condition is interrupted. As a result, the two, right and left, rear wheels rotated by the vehicle together with the two front wheels drive only the two, right and left, wheel drive shafts, 21A and 23A, the first and second hub 4 and 5, the first and second resistance plates 8 and 9 and the inner casing 3b. In other words, since the right and left rear wheel drive shafts 21A and 23A, and the first and second hub 4 and 5, the first and second resistance plates 8 and 9 and the inner casing 3b are only idled. Therefore, the outer casing 3a, the ring gear 2 and the drive pinion gear 1 are not rotated. As a result, the drive system extending from the outer casing 3a, the ring gear 2 and the drive pinion gear 1 to the transfer is not driven in the reverse torque direction. In other words, the rotation resistance of this drive system is reduced, agitation resistance of lubricant within the differential carrier 14 is not produced, and therefore it is possible to improve the fuel consumption rate and reduce abrasion or wear and further noise generated from the drive system.

Where the FF-type four wheel drive vehicle is required to be driven in four-wheel drive (TWIN VISCO IN 4WD) mode by actuating the transfer, the fork 20 is moved by the shift mechanism to slide the driven member 17 in the leftward direction in FIG. 2. Under these conditions, when the revolution of the driven member 17 is synchronized with the revolution of the outer casing 3a, the gear 19 of the driven member 17 is engaged with the gear 18 of the outer casing 3a, as shown in FIG. 3. Therefore, the outer casing 3a is engaged with the inner casing 3b via the driven member 17. Once the outer casing 3a is engaged with the inner casing 3b, an engine torque is transmitted from the drive system (such as transfer) to the drive pinion gear 1, and further to the left side rear wheel drive shaft 21A and the right side rear wheel drive shaft 23A, respectively by way of the ring gear 2, the outer casing 3a, the driven member 17, the inner casing 3b, the first and second resistance plates 8 and 9 and the first and second hubs 4 and 5, so that the vehicle travels in four-wheel drive mode. Further, in FIG. 3, the thick lines indicate the flow of engine torque.

When the front wheel of the vehicle slips on a road whose road surface friction coefficient is small, since the revolution speed of the front wheel drive shaft is higher than that of the rear wheel drive shafts 21A and 23A, the first resistance plates 8 spline coupled with the inner casing 3b rotate relative to the second resistance plates 9 spline coupled to the left and right rear wheel drive shafts 21A and 23A by shearing the silicon oil filling the working chamber 7. Therefore, the shearing force of the silicon oil is transmitted as a torque to the rear wheel drive shafts 21A and 23A, so that the vehicle can be extricated by the rear wheels out of the front wheel slipping conditions to the normal travelling conditions.

Further, when either one of the right and left rear wheels (e.g. the right rear wheel) slips on a road, the non-slipping left rear wheel is subjected to a large resistance. Therefore, a difference in the number of revolutions is produced between the first hub 4 and the inner casing 3b, so that the first resistance plates 8 rotate relative to the second resistance plates 9 by shearing the silicon oil within the working chamber 11. Under these conditions, since the silicon oil shearing force generated by the first and second resistance plates 8 and 9 increases sharply in this embodiment, the silicon oil temperature also rises immediately. Further, in this embodiment, since a gap 21 is formed between the outer casing 3a and the inner casing 3b, heat generated by the silicon oil shearing force with the working chamber 11 is insulated or not easily radiated, so that hump phenomenon (two resistance plates 8 and 9 are brought into direct frictional contact with each other) occurs (LOCK IN 4WD). Therefore, an engine torque is directly transmitted from the inner casing 3b to the left rear wheel drive shaft 21A, so that the vehicle is easily extricated by the left rear wheel out of the right rear wheel slipping conditions to the normal travelling conditions.

Further, when the steering wheel of the vehicle is rotated quickly as when the vehicle is put into a garage, a difference in the number of revolutions is produced between the front and rear wheel drive shafts. However, this rotational speed difference can be absorbed by the relative rotation between the inner casing 3b and the first and second hubs 4 and 5, so that it is possible to prevent the occurrence of tight corner braking phenomenon.

As described above, when the vehicle is travelling in two-wheel drive mode, the driven member 17 is slid to interrupt the engagement between the outer casing 3a and the inner casing 3b. In this case, the drive system is not driven by the vehicle in the reverse torque direction from the outer casing 3a to the transfer 5A by way of the ring gear 2 and the drive pinion gear 1. Therefore, it is possible to reduce the revolution resistance of the drive system, agitation resistance of lubricant within the differential gear 14, improve the fuel consumption rate, and decrease the abrasion and noise in the drive system.

Further, when the vehicle is required to travel in four-wheel drive mode, the driven member 17 is slid to engage the outer casing 3a with the inner casing 3b. In this case, when the front wheels slip, the vehicle is driven by the rear wheels to extricate the vehicle from the front wheel slipping conditions. On the other hand, when either one of the right and left rear wheels slips, the vehicle is driven by the other rear wheel into the normal travelling conditions. Further, when the vehicle is put into a garage, since the inner casing 3b rotates relative to the first and second hubs 4 and 5, it is possible to prevent the vehicle from tight corner braking phenomenon.

In summary, when the power transmission apparatus according to the present invention is provided for a four-wheel drive vehicle, it is possible to obtain three functions of the viscous coupling, the drive power interruption, and the direct coupling (hump). That is, it is possible to quickly extricate the vehicle from a muddy road, and prevent the tight corner braking phenomenon from being produced, when the vehicle is put into a garage, by absorbing difference in revolution speed between the front and rear wheel drive shafts. In addition, when the vehicle is driven in two-wheel drive manner, it is possible to reduce the travel resistance, vibrations and noise generated by the revolution of the rear side power transmission system.

In the apparatus of the present invention, since the outer casing 3a is provided on the outside of the inner casing 3b, even if the enclosed silicon oil is expanded quickly by the relative rotation between the inner casing 3b and the first and second hubs 4 and 5 and therefore the inner casing 3b is damaged or the oil flows out of the inner casing 3b, it is possible to prevent the silicon oil from quickly leaking into the differential carrier 14, that is, to protect the bearing from heat seizure.

A second embodiment of the present invention will be described hereinbelow with reference to FIGS. 4 to 7.

A cylindrical differential casing 29 is composed of a casing body 31 and a cover 33, and rotatably supported by a differential gear carrier 39 via two bearings 35 and 37. A ring gear 41 is fixed to the differential casing 29 by bolts 43. A drive pinion gear 45 is formed integral with a rear end of a drive pinion shaft 47 connected to a propeller shaft 9A and geared with the ring gear 41. As described above, the differential casing 29 is driven by a drive power from the engine 1A. Within the differential casing 29, a pair of first (left) and second (right) hub members 49 and 51 are arranged coaxially with each other. These two hub members 49 and 51 are rotatably supported by axle support portions 53 and 55 formed in the differential casing 29, and rotatably fitted to each other at the fitting portion 57 coaxially so as to support the mutual free ends each other. An annular working chamber 59 is formed between the differential casing 29 and the hub members 49 and 51 and filled with a high viscous silicon oil. Further, two X-shaped (in cross section) rings 61 and 63 and two backup rings 65 and 67 are arranged between the differential casing 29 and the hub members 49 and 51 at the two shaft support portions 53 and 55. Further, an X-shaped ring 69 and a backup ring 71 are arranged between the two hub members 49 and 51 at the fitting portion 57. Therefore, the working chamber 59 is formed watertightly.

Within the working chamber 59, the differential casing 29 is formed with a spline 73 and the hub members 49 and 51 are also formed with splines 75 and 77. A ring-shaped partition wall member (spacer) 79 is engaged with the spline 73 so as to be located near each opposing end portion of the two hub members 49 and 51. That is, the working chamber 59 is partitioned by this wall member 79. This partition wall member 79 is formed with a through hole 81 communicating with the right and left sides within the working chamber 59. A plurality of outer resistance plates 83 are engaged with the spline 73 extending over the right and left sides of the partition wall member 79 so as to be movable in the axial direction thereof. A plurality of inner resistance plates are engaged with the splines 75 and 77 being arranged alternately with the outer resistance plates 83 also so as to be movable in the axial direction thereof. A plurality of spacer 87 are arranged between the two outer resistance plates 83, and a plurality of spacer 89 are arranged between the two inner resistance plates 85. These spacers serve to keep the two resistance plates away from each other at an appropriate distance. A pair of viscous couplings 91 and 93 can be constructed as described above.

Figure 5:
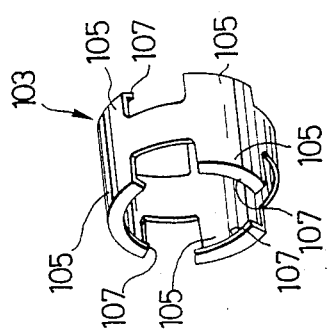
FIG. 5 is a perspective view showing a two drive shaft connecting member.

Within the inner circumferential surfaces of the hub members 49 and 51, two hollow slide clutch pipes 99 and 101 (clutch means) are supported by two slide bearings 95 and 97 so as to be rotatable in the circumferential direction and slidable in the axial direction thereof. These two slide clutch pipes 99 and 101 are connected with each other via a coupling member 103. As shown in FIG. 5, this coupling member 103 is a cylindrical member formed with three flexible arms 105 on both the sides thereof. Further, each arm 105 is formed with a claw 107 extending from an axially outward end of the arm 105 in the radially inward direction of the member 103.

Further, an outer circumferential groove 109 is formed at each opposing end of each slide clutch pipe 99 or 101. When this coupling member 103 is fitted to the two opposing ends of the slide clutch pipes 99 and 101 by engaging the claws 107 of the arms 105 with the two circumferential grooves 109, the two slide clutch pipes 99 and 101 are coupled so as to be rotatable relative to each other in the circumferential direction but slidable together in the both axial directions thereof. Further, the first hub member 49 is formed with an inner spline 111 on the inner circumferential surface thereof; the second hub member 51 is formed with two inner splines 113 and 115 on the inner circumferential surface thereof; and the differential casing 29 is formed with an inner spline 117 on the inner circumferential surface thereof. Further, the slide clutch pipe 99 is formed with an outer spline 119 engageable with the inner splines 111 and 113 on the outer circumferential surface of the pipe 99; and the slide clutch pipe 101 is formed with an outer spline 121 engageable with the inner splines 115 and 117 on the outer circumferential surface of the pipe 101.

Figure 4:
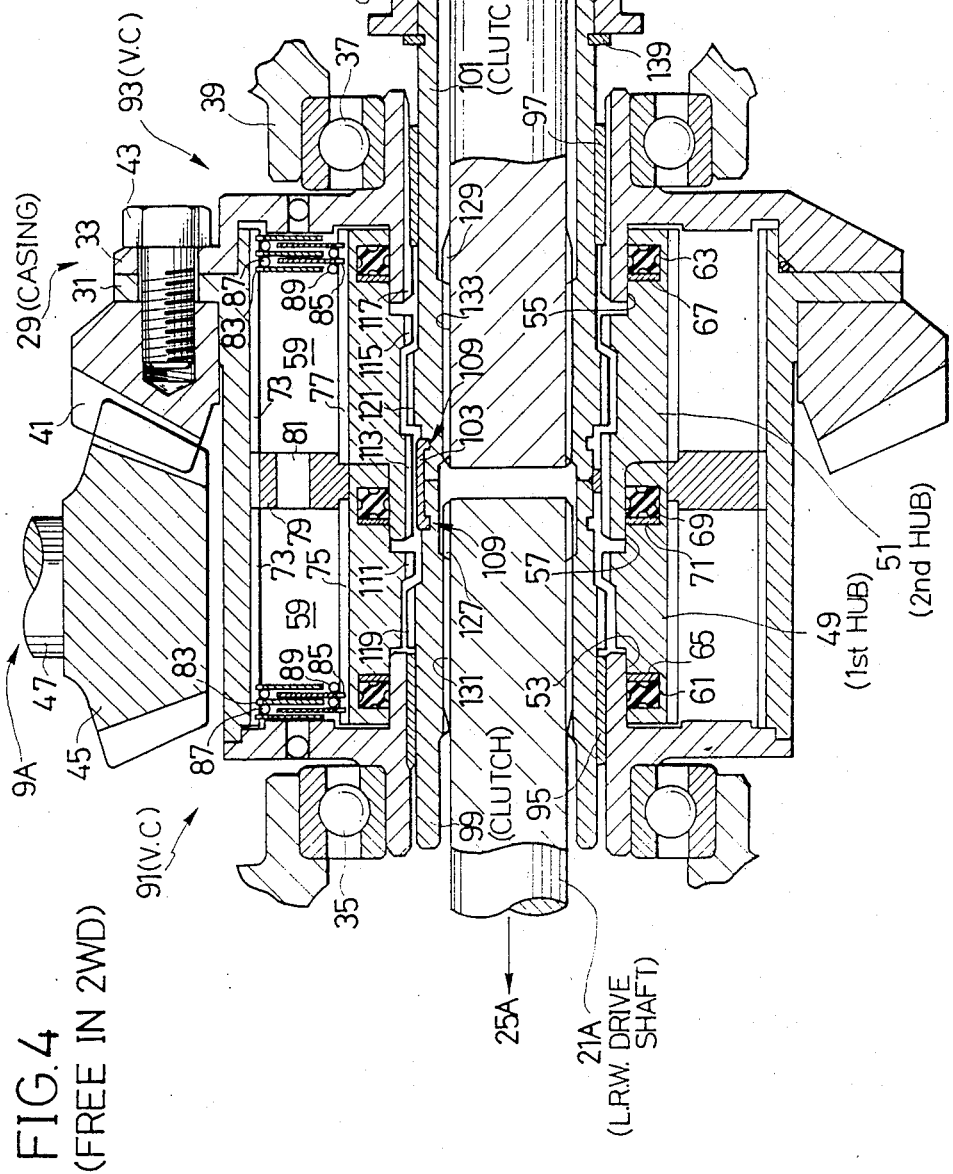
FIG. 4 is a cross-sectional view showing a second embodiment of the power transmission apparatus according to the present invention, in which the casing is disengaged from the viscous coupling to realize the free mode in two-wheel drive operation to eliminate vibration and noise.
Figure 6:
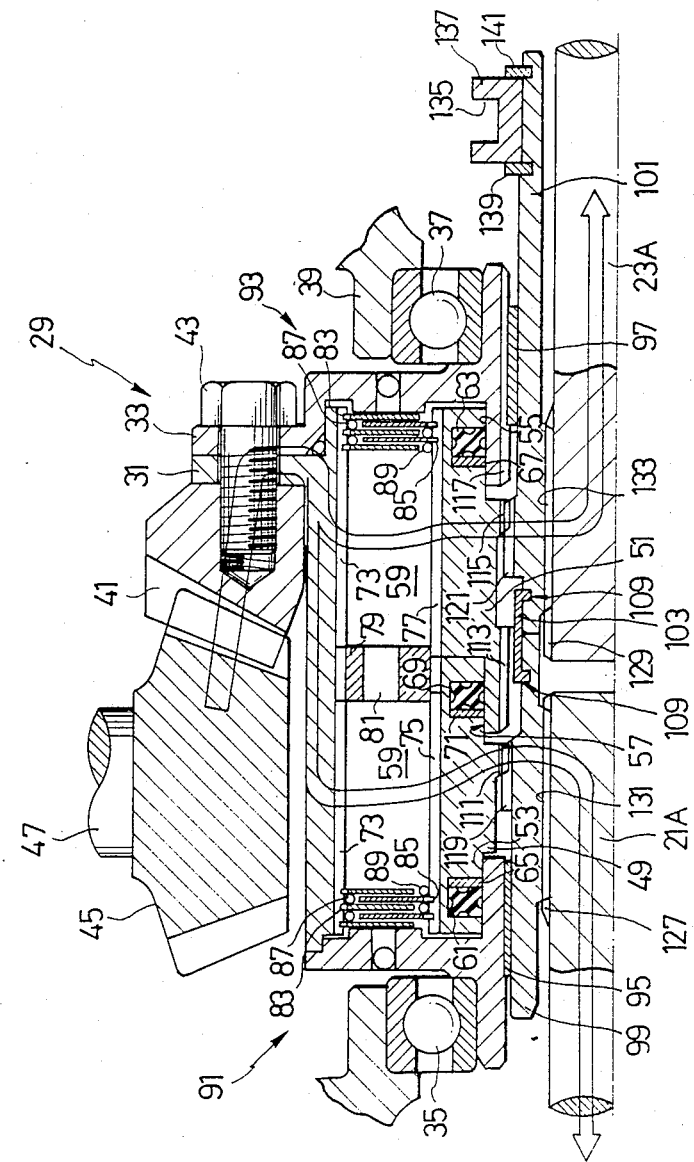
FIG. 6 is a cross-sectional view showing the same second embodiment, in which the casing is engaged with the viscous coupling to realize the twin viscous coupling mode in four-wheel drive operation to extricate the vehicle out of a muddy road.

As shown in FIG. 4, when the clutch splines 119 is disengaged, the clutch spline 121 is also disengaged. However, when the clutch spline 119 is engaged with the hub spline 111, the spline clutch 121 is also engaged with the hub spline 115 as shown in FIG. 6. Further, when the clutch spline 119 is engaged with the hub splines 111 and 113, the clutch spline 121 is also engaged with the hub spline 115 and the casing spline 117, as shown in FIG. 7.

Within the two slide clutch pipes 99 and 101, two first and second rear wheel drive shafts 21A and 23A are arranged coaxially and rotatably relative to each other. The lefthand drive shaft 21A is connected to the left rear wheel via a coupling device (not shown), and the righthand drive shaft 23A is connected to the right rear wheel via a coupling device (not shown). The drive shaft 21A is formed with an outer spline 127 on the outer circumferential surface thereof and the drive shaft 23A is formed with an outer spline 129 on the outer circumferential surface thereof. The slide clutch pipe 99 is formed with an inner spline 131 engageable with the outer spline 127 of the drive shaft 21A, the slide clutch pipe 101 is formed with an inner spline 133 engageable with the outer spline 129 of the drive shaft 23A. These two slide clutch pipes 99 and 101 are fitted to the two drive shafts 21A and 23A so as to be slidable in the axial direction thereof.

A ring 137 formed with an outer circumferential groove 135 is fitted to the slide clutch pipe 101 and located in position by two stopper rings 139 and 141. An arm of a shift fork (not shown) is engaged with this outer circumferential groove 135 of the ring 137, so that the shift fork slides the slide clutch pipe 99 and 101 via the ring 137 in the axial direction.

This shift fork is actuated manually by a driver or automatically according to vehicle steering conditions or road surface conditions.

The operation of this second embodiment will be described hereinbelow.

As shown in FIG. 4, when the slide clutch pipes 99 and 101 are disengaged, since the viscous couplings 91 and 93 are separated away from the two drive shafts 21A and 23A, an engine power transmission is interrupted, so that the rear wheels 25A and 27A are kept at free rotation conditions (FREE IN 2WD).

As shown in FIG. 6, when the slide clutch pipes 99 and 101 are slid in the rightward direction to engage the clutch splines 119 and 121 with the hub splines 111 and 115, an engine power is transmitted from the engine 1A to the left rear wheel 25A via the viscous coupling 91 and to the right rear wheel 27A via the viscous coupling 93 as shown by thick arrows in FIG. 6 (TWIN VISCO IN 4WD). Under these conditions, since the two hub members 49 and 51 are freely rotatable relative to each other, the two viscous couplings 91 and 93 can be differentially rotated independently to transmit an engine power. Therefore, the differential revolution of the viscous coupling 91 or 93 increases with increasing drive resistance of the right and left rear wheels 27A and 25A, so that the rotation difference is increasingly limited and therefore the transmission torque also increases.

Further, the differential revolution of the viscous coupling 91 or 93 decreases with decreasing drive resistance of the eight and left rear wheels 27A and 25A, so that the rotation difference is decreasingly limited and therefore, the transmission torque also decreases.

As described above, the drive power from the engine 1A can be differentially distributed to the right and left rear wheels 27A and 25A. Simultaneously, the rotational difference between the right and left rear wheels 27A and 25A and the rotational difference between the front wheels 17A and 19A and the rear wheels 25A and 27A can be controlled (limited or allowed). As shown in FIG. 7, when the slide clutch pipes 99 and 101 are further slid in the rightward direction to engage the clutch spline 119 with the hub splines 111 and 113 and the clutch spline 121 with the hub spline 115 and the casing spline 117, since the differential casing 29 is engaged with the hub member 51 and further the hub member 51 is engaged with the hub member 49, the two viscous couplings 91 and 93 are both locked (LOCK IN 4WD). Therefore, the differential operations of the viscous couplings 91 and 93 are disabled. Under these conditions, an engine power is directly transmitted from the engine 1A to the right rear wheel 27A via the differential casing 29 and to the left rear wheel 25A via the hub members 51 and 49, respectively, as indicated by thick arrows in FIG. 7. Further, since the right and left hub members 49 and 51 are both locked, the differential distribution function of the drive power and the differential function between the two front wheels 17A, 19A and the rear wheels 25A, 27A are disabled.

The function of the apparatus according to the present invention will be described in relation to the performance of the vehicle as shown in FIG. 1.

When the rear differential gear 11A is allowed to be free as shown in FIG. 4 (FREE IN 2WD), since the two rear wheels 25A and 27A are disconnected from the engine 1A, the vehicle is driven in 2WD mode. In this case, the rotational power of the rear wheels 25A and 27A rotated by the vehicle is not transmitted to the viscous couplings 91 and 93. Therefore, since the power transmission of the rear wheel (25A, 27A) drive system is interrupted in linkage with a 2-to-4 switching mechanism of the transfer, the viscous couplings 91 and 93 and its related drive system are not rotated wastefully, so that it is possible to improve the fuel consumption rate and reduce mechanical abrasion, vibration and noise. As described above, it is possible to obtain the same effect as when the vehicle is provided with a free hub clutch, without additionally mounting the free hub clutch. Further, the operation is more stable than that of the free hub clutch.

When the rear differential gear 11A is changed to the state as shown in FIG. 6, the vehicle is driven in 4WD mode (TWIN VISCO IN 4WD). Therefore, when the vehicle is turned by an external force and therefore a rotational difference is produced between the inner and outer wheels, the rotational difference is limited by the differential restriction function of the rear differential gear 11A and therefore a yawing moment is generated in the direction that the vehicle position can be returned to the original state, so that the vehicle forward stability can be improved. Further, since the drive power can be distributed to the four wheels, each wheel is not easily slipped, so that vehicle driving manipulatability and stability can be improved. In addition, when the front wheels 17A and 19A slip on a muddy road, since the rotational difference between the two viscous couplings 91 and 93 increases, a large torque can be transmitted to the rear wheels 25A and 27A, so that the extricability from the muddy road and the running capability over a long distance can be improved.

Further, when the vehicle travels along a corner, since the rotational difference between the inner and outer wheels (the two rear wheels 25A and 27A) and between the front and rear wheels can be absorbed by the viscous couplings 91 and 93, it is possible to obtain smooth cornering operation.

Further, when the rear differential gear 11A is locked as shown in FIG. 7 (LOCK IN 4WD), since the rear wheels 25A and 27A are directly coupled to the engine 1A, a large drive power can be transmitted, so that the running capability over a long distance on muddy roads and high speed straight drive capability can be improved.

As described above, the power transmission apparatus of the present invention can transmit torque under control (restriction and permission) of the rotational difference and further can interrupt the torque transmission. When the torque is interrupted, it is possible to eliminate the loss due to the operation of the viscous couplings.

What is claimed is:

1. A power transmission apparatus for transmitting power from a propeller shaft to first and second coaxially aligned rear wheel drive shafts in a four-wheel drive vehicle, which comprises:
   (a) a first hub surrounding the first rear wheel drive shaft;
   (b) a second hub surrounding the second rear wheel drive shaft and aligned coaxially with said first hub;
   (c) a cylindrical casing formed with a ring gear, said casing being disposed coaxially with and being rotatable relative to the first and second hubs so as to surround said first and second hubs, an annular working chamber being formed between said first and second hubs and said cylindrical casing;
   (d) a plurality of first resistance plates engaged with an inner circumferential surface of said casing;
   (e) a plurality of second resistance plates engaged with an outer circumferential surface of said first and second hubs, each of said second resistance plates intervening between two of said first resistance plates;
   (f) a drive pinion gear coupled to the propeller shaft and in mesh with the ring gear of said cylindrical casing; and
   (g) clutch means disposed between the first and second rear wheel drive shafts and said first and second hubs, for selectively engaging the two rear wheel drive shafts with said two hubs in a first operating mode to realize a twin viscous coupling in four-wheel drive, for directly engaging the two rear wheel drive shafts with said cylindrical casing in a second operating mode to realize a viscous coupling lock in four-wheel drive, and for disengaging the two rear wheel drive shafts from both said two hubs and said cylindrical casing in a third operating mode to realize free coupling in two-wheel drive.

2. The power transmission apparatus of claim 1, wherein said clutch means is a slidable hollow pipe spline coupled to circumferential surfaces of said first and second rear wheel drive shafts and formed in an outer circumferential surface thereof with outer clutch splines selectively engageable with a first hub spline formed in an inner circumferential surface of said first hub, with two second hub splines formed in an inner circumferential surface of said second hub, and with a casing spline formed in an inner circumferential surface of said cylindrical casing.

3. A power transmission apparatus for transmitting power from a propeller shaft to first and second coaxially aligned rear wheel drive shafts in a four-wheel drive vehicle, which comprises:
   (a) a first hub surrounding the first rear wheel drive shaft;
   (b) a second hub surrounding the second rear wheel drive shaft and aligned coaxially with said first hub;
   (c) a cylindrical casing formed with a ring gear, said casing being disposed coaxially with and being rotatable relative to the first and second hubs so as to surround said first and second hubs, an annular working chamber being formed between said first and second hubs and said cylindrical casing;
   (d) a plurality of first resistance plates engaged with an inner circumferential surface of said casing;

(e) a plurality of second resistance plates engaged with an outer circumferential surface of said first and second hubs, each of said second resistance plates intervening between two of said first resistance plates;
(f) a drive pinion gear coupled to the propeller shaft and in mesh with the ring gear of said cylindrical casing; and
(g) clutch means comprising a slidable hollow pipe spline coupled to circumferential surfaces of said first and second rear wheel drive shafts and formed in an outer circumferential surface thereof with outer clutch splines selectively engageable with a first hub spline formed in an inner circumferential surface of said first hub, with two second hub splines formed in an inner circumferential surface of said second hub, and with a casing spline formed in an inner circumferential surface of said cylindrical casing.

* * * * *